(12) United States Patent
Hegner et al.

(10) Patent No.: US 6,675,654 B2
(45) Date of Patent: Jan. 13, 2004

(54) PRESSURE SENSING DEVICE WITH MOISTURE FILTER

(75) Inventors: Frank Hegner, Lörrach (DE); Andreas Rossberg, Bad Säckingen (DE); Elke Schmidt, Bad Säckingen (DE); Ulfert Drewes, Müllheim (DE); Michael Kirst, Freiburg (DE); Bernhard Walter, Erlstätt (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/138,519

(22) Filed: May 6, 2002

(65) Prior Publication Data

US 2003/0005772 A1 Jan. 9, 2003

Related U.S. Application Data

(60) Provisional application No. 60/314,639, filed on Aug. 27, 2001.

(30) Foreign Application Priority Data

May 9, 2001 (DE) .......................... 101 22 511
Oct. 27, 2001 (WO) ................. PCT/EP01/12469

(51) Int. Cl.[7] ................................. G01L 7/08
(52) U.S. Cl. ........................................ 73/715
(58) Field of Search ................... 73/706, 714, 715, 73/716, 717, 718, 719, 720, 721, 722, 723, 724, 725, 726, 727, 756

(56) References Cited

FOREIGN PATENT DOCUMENTS

| DE | 19833247 A1 | 2/2000 |
|---|---|---|
| EP | 0974825 A2 | 1/2000 |
| EP | 1070948 A1 | 1/2001 |
| GB | 2014868 A | 9/1979 |
| WO | WO 98/11974 | 3/1998 |
| WO | WO 99/64504 | 12/1999 |

*Primary Examiner*—William Oen
(74) *Attorney, Agent, or Firm*—Jones, Tullar & Cooper, P.C.

(57) ABSTRACT

A chamber in the interior of a housing communicates with the environment of the housing by means of a gas esxchange path, wherein a filter element with a hydrophobic and/or hydrophobicized, nanoporous material is placed in the gas exchange path. The chamber serves, e.g. to accomodate electronic circuitry, or it is chamed as a reference pressure chamber of a relative pressure sensor. The relative pressure sensor according to the present invention for capturing a measured pressure with respect to a reference pressure comprises a reference pressure path 23 which extends between a surface which can be exposed to the reference pressure and an opening in a reference pressure chamber 22, a filter element 30 which is arranged in the reference pressure path comprising a hydrophobic or hydrophobicized, nanoporous material. The filter element allows pressure compensation on account of its permeability to $N_2$ and $O_2$, while water molecules are selectively blocked. The nanoporous material preferably comprises an inorganic material, in particular $Al_2O_3$, $TiO_2$ or $SiO_2$. The nanoporous material is preferably hydrophobic and/or can be impregnated with a hydrophobic layer, preferably a silane, in order to optimize the hydrophobic properties.

10 Claims, 3 Drawing Sheets

PRESSURE SENSING DEVICE WITH MOISTURE FILTER

This application is based on Provisional Application, filed Aug. 27, 2001, as application No. 60/314,639.

The invention generally relates to housings or devices with moisture sensitive components, such as e.g. housings with moisture sensitive electronic circuitry or measuring devices with moisture sensitive sensors. This group of devices especially comprises relative pressure sensors.

Relative pressure sensors can be used to measure pressures of media, for example of liquids, gases or vapors, with respect to the currently prevailing atmospheric or ambient pressure, this atmospheric or ambient pressure therefore serving as a reference pressure. In this context, the humidity of the reference air has proven to be a problem, since the humidity can penetrate into the sensor via a reference pressure line and can condense out at temperatures which lie below the dew point. Therefore, there have been extensive efforts to prevent the moisture from penetrating into the sensor.

By way of example, Japanese patent application No. 07110364 has disclosed a capacitive relative pressure sensor with a base body and a diaphragm which is connected, along its edge region, in a pressure-tight manner to the base body, so as to form a reference pressure chamber. The reference air is introduced into the reference pressure chamber through a reference pressure line and a bore. In the reference pressure line there is a water absorber which is intended to dry the reference air.

This solution is unsatisfactory to the extent that the moisture content in the absorber is enriched. When the absorber is saturated, or when the temperature rises and some of the bound water can be desorbed again, moisture passes into the sensor.

The European patent application which bears the publication number 974 825 A2 follows a different approach. The structure of the relative pressure sensor is generally as described above, but a hydrophobic filter element is used instead of the absorber, this element being held at a temperature which the temperature inside the sensor never falls below and is preferably significantly colder than the temperatures in the interior of the sensor. In this way, moisture condenses out at the filter element when the filter temperature falls below the dew point of the warmer ambient air. Therefore, the air which enters the interior of the sensor only has a water content which corresponds to a relative atmospheric humidity of 100% at the filter temperature. However, since the temperature inside the sensor never falls below the filter temperature and is generally in fact above the filter temperature, there is no possibility of the moisture condensing in the interior of the sensor, since the dew point is not reached.

The required cooling of the filter element is achieved, for example in sensors for the food industry, by keeping the filter element in thermal contact with the cold process medium via the sensor housing. The device described is advantageous to the extent that the saturation problems which arise with an absorber do not occur.

On the other hand, the need to control the temperature of the filter element entails significant design limitations which are unacceptable for certain applications.

Moreover, the user is subject to restrictions in terms of operation and maintenance of the pressure-measuring device. By way of example, if the filter element were to be heated, during cleaning operations, to temperatures which lie above the normal operating temperature in the interior of the sensor, it would be possible for air with a high level of humidity to penetrate into the sensor, and this moisture could then condense at normal operating temperature.

For similar reasons, the above filter elements or absorbers are unsuitable for other devices with moisture sensitive components which require a gas exchange with the ambient for the purpose of cooling or pressure adjustment. This especially applies, if changes of the ambient temperature with associated changes of the reative humidity must be expected. Such moisture sensitive components may be, for instance, electronic circuits.

The present invention is therefore based on the object of providing a device with a filter element which overcomes the problems described.

According to the invention, the object is achieved by the relative pressure sensor according to the independent patent claim 1, and by the device according to independent patent claim 8. Further advantages and aspects of the invention are given in the dependent claims, the description and the drawings.

The device comprises a housing which defines a chamber in its interior which comprises at least one aperture through which the chamber is in fluid communication with the environment of the housing by means of a gas exchange path; and a filter element disposed in the gas exchange path, said filter element comprising a hydrophobic and/or hydrophobicized, nanoporous material.

An especially preferred embodiment the chamber comprises an inlet aperture and an outlet aperture, through which the chamber is in fluid communication with the environment of the chamber by means of respective gas exchange paths, wherein a respective filter element is provided in both gas exchange paths, said filterelements comprising a hydrophobic and/or hydrophobicized, nanoporous material The device is especially suitble as housing for electronic circuitry. Optionally, an airflow can be guided through the chamber by means of a conventional ventilator, therby enabling an effective heat exchange.

The relative pressure sensor according to the invention for capturing a measured pressure with respect to a reference pressure comprises:
  a sensor element having
    a base body and
      a measurement diaphragm which, along its edge region, is connected in a pressure-tight manner to the base body so as to form a reference pressure chamber,
      the measurement diaphragm having a first diaphragm surface, which faces away from the reference pressure chamber and can be exposed to the measured pressure, and a second diaphragm surface, which faces the reference pressure chamber;
    a reference pressure path which extends between a surface which can be exposed to the reference pressure and an opening in the reference pressure chamber, with the result that the second diaphragm surface can be exposed to the reference pressure; and
    a filter element which is arranged in the reference pressure path;
  wherein
    the filter element comprises a hydrophobic and/or hydrophobicized, nanoporous material.

The nanoporous material is preferably arranged as a layer on a porous support material or is embedded in the matrix of a porous support material, the support material serving in particular to ensure the required mechanical stability.

The nanoporous material preferably comprises an inorganic material, in particular a ceramic material, $Al_2O_3$ or $TiO_2$ being preferred. ZrO2, $SiO_2$, aluminosilicates, aluminum beryllium silicates; apatite, cordierite, mullite, zeolite, SiC and $Si_3N_4$, carbon, Vycor Glass and their mixtures are in principle also suitable.

In this context, the term "nanoporous" refers to a pore size distribution whose maximum, based on the pore frequency, lies at a pore diameter of less than 4 nm, preferably less than 2.5 nm, more preferably between 0.4 and 2 nm, even more preferably between 0.5 and 1.5 nm, and particularly preferably between 0.7 and 1 nm. In a particularly preferred exemplary embodiment, the distribution maximum is approximately 0.9 nm.

The preferred production process using the sol gel process can be used to achieve a sufficiently narrow pore size distribution which ensures a uniform filter action. The maximum pore diameter should preferably be no more than 10 nm, more preferably no more than 5 nm, even more preferably no more than 2 nm.

The terms microporous and mesoporous are also customarily used in filtration technology to describe layers with pore sizes in the nanometer range. According to this technology, what are known as mesoporous layers have pore diameters of between 2 nm and 50 nm, while what are known as microporous layers have pore diameters of less than 2 nm. In the context of these definitions, the nanoporous material used in the invention is to be classified in the microporous range or at the lower end of the mesoporous range. In the text which follows, the term "nanoporous" will continue to be used in connection with the materials used according to the invention.

The layer thickness of the nanoporous material may in each case be adapted to the desired filter action, which is dependent on the pore size distribution and the hydrophobic properties. The layer must be sufficiently thick, so that there are no defects in the material which would endanger the filter action.

On the other hand, it is recommended for the nanoporous layer to be as thin as possible, in order to minimize the flow resistance for the gases which are to be allowed to pass through, for example $N_2$ or $O_2$. Finally, the surface of the filter element is to be designed in such a way that, with the flow resistance per unit area which is present on account of the required filter action, it is possible to achieve sufficiently rapid pressure compensation through the filter element in the event of pressure pulses.

Typical conductivities for gaseous media in the case of filter elements with nanoporous layers are approximately 20 to 800 $mm^3/(cm^2 s$ bar), preferably 20 to 200 $mm^3/(cm^2 s$ bar).

The layer thickness of the nanoporous material is preferably at least 20 nm, more preferably at least 40 nm, and particularly preferably at least 80 nm. The layer thickness of the nanoporous material is preferably no more than 4 $\mu m$ more preferably no more than 2 $\mu m$, even more preferably no more than 1 $\mu m$, and particularly preferably no more than 0.5 $\mu m$.

Particularly in the case of applications which involve considerable temperature fluctuations, the support material for the nanoporous layer should preferably have the same thermal expansion behavior as the filter material, in order to minimize the mechanical stress on the filter material. However, the importance of this requirement decreases as the layer thickness of the nanoporous material falls.

Layer systems with 2, 3 or more chemically and/or morphologically different layers are also suitable for implementing the invention. In this context, preference is given to layer systems in which layers with stepped pore sizes follow one another, the layer systems having at least one layer of nanoporous material.

In a preferred group of filter elements, these elements have a layer structure with a nanoporous layer of $TiO_2$ with a mean pore size of approximately 0.7 to 1.2 nm, preferably approximately 0.9 nm, the nanoporous layer having a mean thickness of between 30 and 100 nm, preferably between 40 and 70 nm, particularly preferably between 45 and 55 nm. The nanoporous layer described is applied to a ceramic middle layer, preferably of $TiO_2$, with a mean pore size of between 3 and 10 nm, preferably between 4 and 7 nm, particularly preferably between 5 and 6 nm, and with a mean thickness of 300–1000 nm, preferably 400–800 nm, particularly preferably about 450–550 nm. The middle layer is in turn applied to a series of support layers with increasing pore sizes and increasing thicknesses, these layers preferably containing $Al_2O_3$. The support layer which has the largest pores, on top of which the support layers with finer pores are formed, preferably has a mean pore size of a few $\mu m$, preferably between 2 and 10 $\mu m$, particularly preferably between 2.5 and 5 $\mu m$, and a thickness of a few 100 $\mu m$ to about 2 mm.

The layers which are active in separation are preferably produced using a sol gel process, as described, for example, by Larbot et al. in International Journal of High Technology Ceramics 3 (1987), pages 143–151.

With the sol gel process, the pore size can be controlled very accurately by means of the hydrolysis and condensation conditions. Moreover, the firing temperature is to be adapted to the desired pore size, as explained by Larbot et al.

Suitable diaphragm materials are also commercially available from the Hermsdorfer Institut fur Technische Keramik or Inocermic GmbH. Other suitable materials are marketed under the trade name KEMIHOFA®.

The hydrophobic properties of the filter material can be improved by suitable coatings. For this purpose, the diaphragm may preferably be impregnated with an organic solvent which contains a hydrophobic substance in solution. Although the concentration of the substance is not critical, concentrations of between 0.5–20% by weight, preferably approximately 0.5–10% by weight, particularly preferably 0.5–5% by weight, have proven suitable for the hydrophobicizing.

In principle, any desired hydrophobic substances, such as waxes, aliphatic and aromatic hydrocarbons, silicones and silicone resins, are suitable. Preference is given, inter alia, to organosilanes, in particular silanes of the formula $R_y$—Si—$X_{4-y}$, where R denotes a hydrophobic radical, X denotes a hydrolyzable group and $1 \leq y \leq 3$. Methyl silanes, phenyl silanes, octadecyltrichlorosilane, di-(dodecyl)-difluorosilanes and other fluorine-containing silanes are particularly preferred. $R_y$—Zr—$X_{4-y}$ and $R_y$—Ti—$X_{4-y}$ are also suitable.

The impregnation is promoted by an open porosity with pore widths which allow the carrier medium and the hydrophobicizing agent to penetrate. Layers which have not completely solidified and the structure of which swells during the impregnation step are also suitable.

Further details about hydrophobic coatings have been published, for example, in the British patent application GB 2 014 868 A.

Moreover, hydrophobic material can also be deposited on a nanoporous layer by vapor deposition, in order to hydrophobicize this layer. Vapor deposition is particularly suitable if solvents impair the coating operation.

As an alternative to the subsequent impregnation of the filter material with a hydrophobic solution, it is also possible for a hydrophobic substance to be admixed with the starting materials. Examples of such substances are organic/inorganic hybrid materials, such as ormocers (a contraction of organic modified ceramics). Examples of suitable starting materials for this purpose are tetraethylorthosilane and methyltriethoxysilane.

Nanoporous layers based on pyrolyzed carbon or based on colloidal organic, hydrophobic particles do not require any additional hydrophobicizing, since they are already inherently sufficiently hydrophobic.

A filter element which has been designed according to the principles described above ensures that the water contained in the air is retained by the filter element, even at temperatures above the dew point, without impairing the pressure compensation between the ambient air and the reference pressure chamber. In this way, the water content of the air in the reference pressure chamber can be kept so low that the relative atmospheric humidity in the reference pressure chamber remains below 100% for a prolonged period even at low temperatures which lie below the dew point of the environment of the sensor, so that condensation of water can be avoided.

Although the filter element can be arranged at any desired position on the reference pressure path, it is preferable for the filter element to be arranged in the vicinity of the surface which can be exposed to the reference pressure or for the filter element to be integrated into this surface.

A relative pressure sensor usually comprises a housing in which the sensor element is arranged, and the surface which can be exposed to the relative pressure is in this case preferably a surface of the housing.

Electronic circuits for generating a measurement signal are usually arranged in a section of the housing of the relative pressure sensor.

The invention will now be described with reference to the appended drawings, in which.

Figure 3:
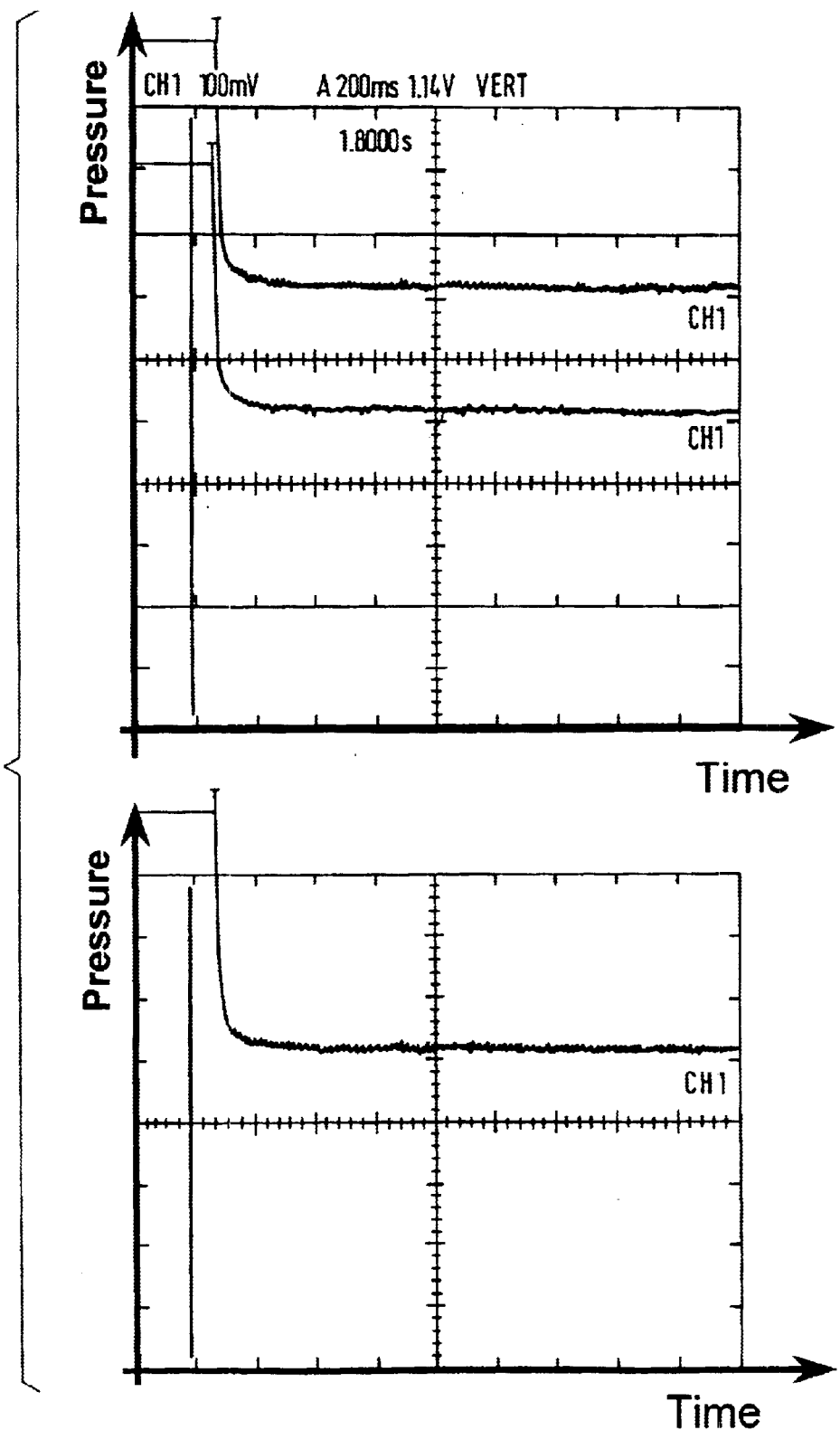
Figure 4:
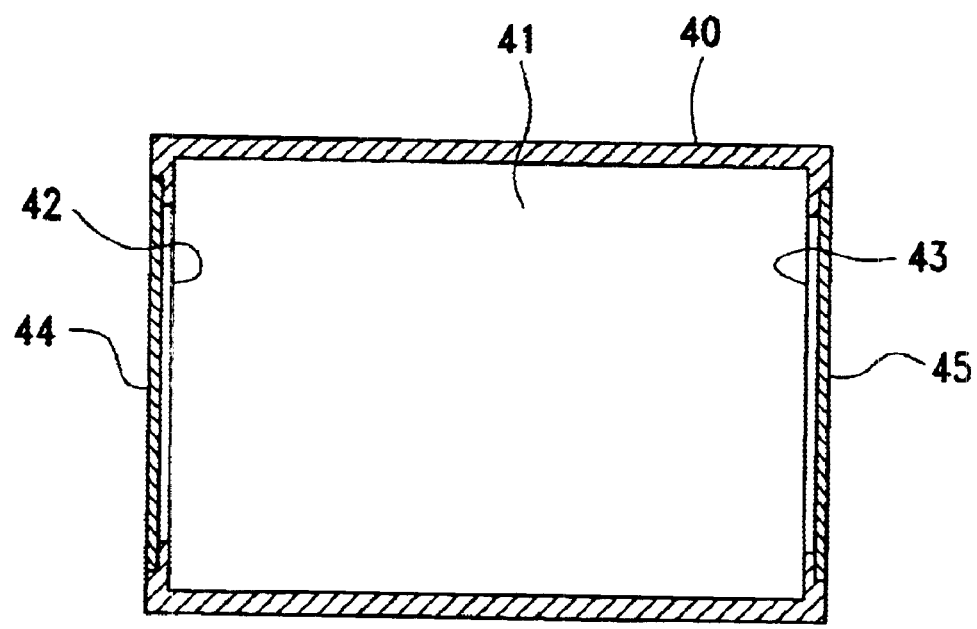

FIG. 3 shows the step response of a relative pressure sensor with filter according to the invention to a pressure pulse compared to the step response of a relative pressure sensor without is filter, and also superimposes the two step response curves; and FIG. 4 shows a housing according to the present invention for electronic circuitry The relative pressure sensor according to the invention comprises a housing 10, in the interior of which a sensor element 20 which is preferably of cylindrical structure is arranged.

The sensor element comprises a base body 26, which is connected in a pressure-tight manner to a measurement diaphragm 21, a reference pressure chamber 22 being formed between the measurement diaphragm. A first diaphragm surface faces away from the base body 26 and can be exposed to a measurement pressure which can be introduced into a cavity 12 in the housing through a connection 11. The cavity is delimited by the measurement diaphragm 21, an annular seal 13 preferably being clamped axially between a stop face of the housing and the measurement diaphragm 21, in order to seal the cavity.

The pressure-dependent deformation of the measurement diaphragm 21 is detected by suitable means, for example capacitively, resistively or inductively, and is converted into a measurement signal which is removed from the housing via a line 27. Details of the way in which these measurement principles are implemented are common knowledge to the person skilled in the art and require no further explanation here.

The second diaphragm surface, which faces the base body 26, of the measurement diaphragm 21 can be exposed to the reference pressure, which is introduced into the reference pressure chamber 22 via a reference pressure line 23.

The reference pressure line 23 is preferably guided radially out of the housing 10 and opens out in a filter chamber 24 which has an opening 25 leading to ambient air. A diaphragm-like filter element 30, which takes up the entire cross-sectional area of the filter chamber 24, is arranged in the filter chamber 24. In its edge region, the filter element is connected in a gastight manner to the filter chamber, so that all the gas has to be transferred through the surface of the diaphragm-like filter element.

The filter chamber preferably has a cover with a gas inlet, in order to protect the filter element from mechanical damage. Although other arrangements of the filter element are conceivable, it is in principle advisable for the filter element to be designed so that it is protected from mechanical loads. Equally, the filter element is to be protected from aggressive reagents, if the relative pressure sensor according to the invention is to be used in the vicinity of such substances.

The filter element has a nanoporous material which is impregnated with a hydrophobic organosilane.

The filter element of the exemplary embodiment in this case has the layer structure presented in Table 1 below.

TABLE 1

| Material | Layer thickness | Mean pore size |
|---|---|---|
| $TiO_2$ | 0.05 µm | 0.9 nm |
| $TiO_2$ | 0.5 µm | 5 nm |
| $Al_2O_3$ | 10–20 µm | 60 nm |
| $Al_2O_3$ | 10–20 µm | 200 nm |
| $Al_2O_3$ | 100 µm | 1 µm |
| $Al_2O_3$ | Support 400–600 µm | 3 µm |

Figure 1:
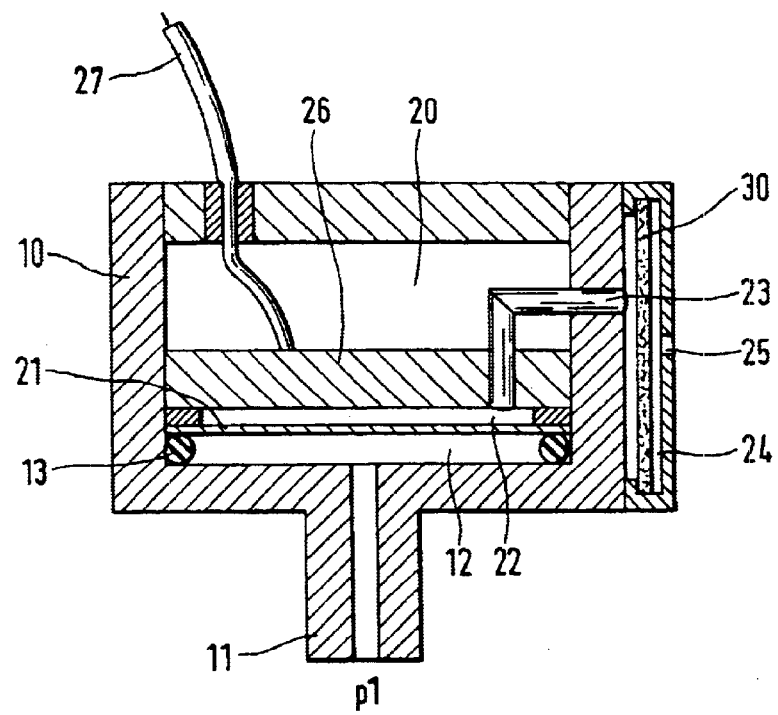
FIG. 1 shows a longitudinal section through a relative pressure sensor according to the invention.
Figure 2:
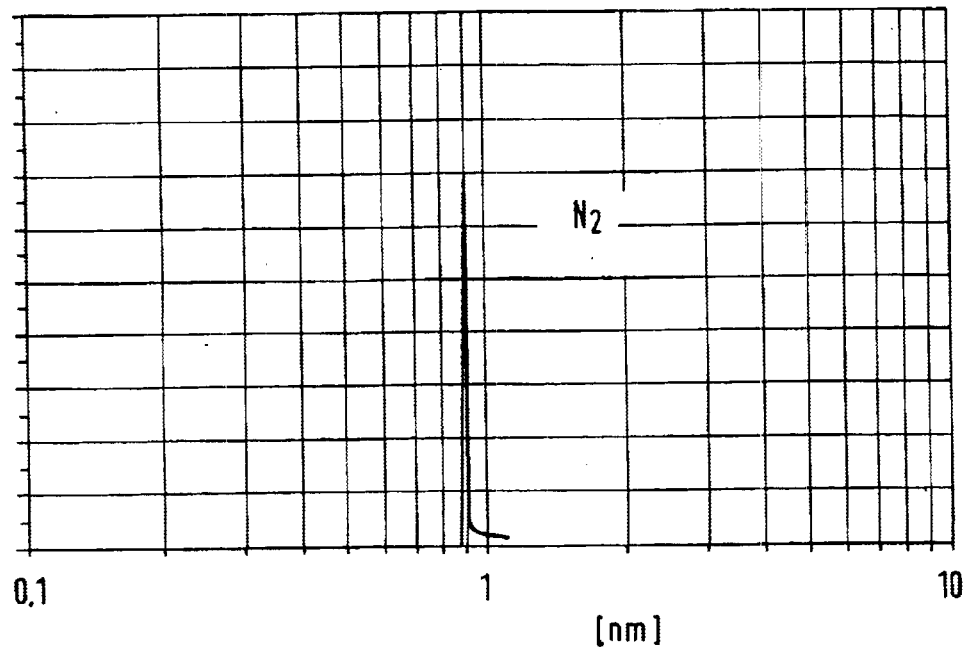
FIG. 2 shows the frequency distribution of the pore diameters for the nanoporous material of a preferred filter element.

The pore size distribution of the filter element with a mean pore size of 0.9 nm is illustrated in FIG. 2. On account of the very narrow pore size distribution, a homogeneous filter action is to be expected for the entire filter element.

To check whether a filter element impairs the start-up performance of the relative pressure sensor according to the invention, a relative pressure sensor with a nominal pressure range of 400 mbar was exposed to an overload pressure of 6 bar. The step response after the pressure had been relieved as quickly as possible was measured in each case with a filter element and without a filter element. In this embodiment, the relative pressure sensor had an internal volume of approximately 20 mm$^3$ without the application of pressure. The internal volume when pressure was applied with an overload was approximately 7 mm$^3$, meaning that a gas volume of approximately 13 mm$^3$ at standard pressure had to flow through the filter element in order to reach the equilibrium state after the pressure relief. Representative results of the measurements are shown in FIG. 3, in which the top curve in the top diagram shows the step response with a filter and the bottom curve in the top diagram shows the step response without a filter. The bottom diagram superimposes the two curves, the two curves running substantially identically. It follows from this that the step response of the filter element is practically unimpaired.

The start-up time with and without filter element was 210 ms, the output signal after this start-up time being in an error band of ±0.25%. It was impossible to detect any lag effects over a measurement time of approximately 10 sec.

Consequently, the measurement accuracy and the start-up time of the relative pressure sensor in response to pressure fluctuations are not impaired in any way by the filter element.

During the production of the relative pressure sensor according to the invention, it should be ensured that the reference pressure chamber 24 is absolutely dry, since moisture contained in the reference pressure chamber would be unable to escape on account of the filter function.

The sensor element of the relative pressure sensor according to the invention may in particular be a capacitive, resistive or inductive sensor element, but the invention can be implemented with any sensor element irrespective of the measurement principle selected.

In principle, any desired arrangements are possible for the relative pressure sensor. For example, the first diaphragm surface of the measurement diaphragm may be brought into direct contact with the medium to be measured, or alternatively it is possible to provide a separating body with a separating diaphragm, in which case the separating diaphragm comes into contact with the medium to be measured and the pressure which is present at the measurement diaphragm is hydraulically transferred to the first diaphragm surface of the measurement diaphragm. The measures required for this purpose are well known to the person skilled in the art and do not require extensive explanation here.

Finally, FIG. 4 shows a housing for electronic circuitry 40 which defines a chamber 41 in its interior. The chamber comprises a first aperture 42 and a second aperture 43, through which the chamber communicates with the environment of the housing. Filter elements 44, 45 are placed in the first aperture 42 and the second aperture 43, respectively, wherein said filter elements comprise a hydrophobic and/or hydrophobicized, nanoporous membrane. Regarding the details of the filter elements, reference is made to the above description of the filter elements for relative pressure sensors according to the present invention. The filter elements described in that context are suitable for the housing for electronic circuitry according to the present invention without any restriction.

A ventilator may be provided optionally to increase the gas flow through the chamber 41. This might be necessary if the heat dissipated from electronic circuitry (not shown) cannot be removed sufficiently by thermal convection.

Further aspects regarding the dimensions of the filter elements for a given volume of the housing or a required cooling rate are easily derivable for a person skilled in the art, without any further detailed discussion.

What is claimed is:

1. A relative pressure sensor for capturing a measured pressure with respect to a reference pressure, comprising:
   a sensor element having
      a base body and
      a measurement diaphragm which, along its edge region, is connected in a pressure-tight manner to the base body so as to form a reference pressure chamber,
      the measurement diaphragm having a first diaphragm surface, which faces away from the reference pressure chamber and can be exposed to the measured pressure, and a second diaphragm surface, which faces the reference pressure chamber;
   a reference pressure path which extends between a surface which can be exposed to the reference pressure and an opening in the reference pressure chamber, with the result that the second diaphragm surface can be exposed to the reference pressure; and
   a filter element which is arranged in the reference pressure path;
   wherein
      the filter element comprises hydrophobic or hydrophobicized, nanoporous material.

2. The relative pressure sensor as claimed in claim 1, in which the nanoporous material is arranged as a layer on a support material or in the matrix of a porous support material.

3. The relative pressure sensor as claimed in claim 1, in which the nanoporous material contains one of the substances $Al_2O_3$, $TiO_2$, $ZrO_2$, $B_2O_3$, $CeO_2$, mullite, zeolite, silicates (aluminosilicates, aluminum beryllium silicates, apatite, cordierite), phosphates, SiC or $Si_3N_4$, carbon, Vycor Glass or mixtures of these substances.

4. The relative pressure sensor as claimed in claim 1, in which the nanoporous material comprises an ormocer or an inorganic polymer, in particular silicone resin, polycarbosilanes or polycarbo-silazanes.

5. The relative pressure sensor as claimed in claim 1, in which the nanoporous material has a mean pore diameter of less than 4 nm, preferably less than 2.5 nm, more preferably between 0.4 and 2 nm, even more preferably between 0.5 and 1.5 nm, and particularly preferably between 0.7 and 1 nm.

6. The relative pressure sensor as claimed in claim 1, in which the nanoporous material is laid with a hydrophobic layer.

7. The relative pressure sensor as claimed in claim 6, in which the hydrophobic layer contains at least one organosilane.

8. A device, comprising a housing (40) which defines a chamber (41) in its interior which comprises at least one aperture (42, 43) through which the chamber is in fluid communication with the environment of the housing (40) by means of a gas exchange path and at least one filter element (44, 45) disposed in the gas exchange path, said filter element comprising a hydrophobic and/or hydrophobicized, nanoporous material.

9. The device of claim 8, wherein the chamber (41) comprises an inlet aperture (42) and an outlet aperture (43), wherein filter elements (44, 45) are disposed in both gas exchange paths, respectively, said filterelements (44, 45) comprising a hydrophobic and/or hydrophobicized, nanoporous material.

10. The device according to claim 9, further comprising a ventilator to effect an air flow through the inlet aperture 44 and the outlet aperture 45.

* * * * *